Sept. 22, 1970 K. R. BRAGG 3,529,855
COUPLING FOR TUBES
Filed Sept. 21, 1966

INVENTOR
KENNETH R. BRAGG

BY Oberlin, Maky & Donnelly
ATTORNEYS

United States Patent Office 3,529,855
Patented Sept. 22, 1970

3,529,855
COUPLING FOR TUBES
Kenneth R. Bragg, Redondo Beach, Calif., assignor to Parker-Hannifin Corporation, Cleveland, Ohio, a corporation of Ohio
Continuation-in-part of application Ser. No. 192,137, May 3, 1962. This application Sept. 21, 1966, Ser. No. 581,037
Int. Cl. F16l 13/14, 19/08
U.S. Cl. 285—331            6 Claims

ABSTRACT OF THE DISCLOSURE

A tube coupling including an angular lip having inner and outer lip portions which in the undeformed condition are in the shape of a toggle mechanism and in the deformed condition, the inner lip portion is cylindrical and extends beyond a radial enlargement on the end of a tube, and the outer lip portion extends radially and axially inwardly into engagement with the radial enlargement, the relative length of such inner and outer lip portions with respect to the length of the radial enlargement being such that when the lip is deformed, the radial squeezing forces are transformed into axial coupling forces so that the inner lip portion is under tension and the outer lip portion is under compression, thereby firmly engaging the radial enlargement despite springback of the lip.

---

The present invention is a continuation-in-part of my copending application Ser. No. 192,137, filed May 3, 1962, now Pat. No. 3,287,034, and relates generally as indicated to couplings for tubes and more particularly to couplings suitable for use in the fluid control circuits of missiles and space vehicles.

For missile and space vehicle applications, it is imperative that the tube couplings thereof be absolutely fluid-tight for all fluids and environmental conditions. Such tube couplings must also be capable of withstanding vibration and thermal and mechanical shock. It has been proposed heretofore to employ couplings in which the tubes are brazed or welded to the coupling members to make connections while the tubing is installed in the vehicle. Although perfect brazed joints have the necessary strength and fluid sealing characteristics for missile and space vehicle application, they are rather difficult to achieve since the parts must be absolutely clean, mating surfaces must be properly fluxed or purged of oxygen, axial alignment of the tubes and the coupling are critical, the brazing temperatures and time must be closely regulated to secure proper flow of the brazing alloy, and the heating tends to degrade the physical properties of heat treated tubes. Aside from the foregoing, final inspection for reliability of the brazed joints is difficult. Welded joints may also have suitable strength and sealing characteristics; however, they present some of the disadvantages of brazing and in addition introduce an inherent corrosion problem in the heat affected zone of the tubing.

With the foregoing in mind, it is a principal object of the present invention to provide a tube coupling which fulfills the strict needs in missile and vehicle applications, while avoiding the need of employing brazing, welding or like operations.

It is another object of this invention to provide such a tube coupling in which a coupling member and tube are locked together to provide a strong and fluid-tight joint to withstand vibration and thermal and mechanical shock.

Still another object is to provide a swaged tube coupling assembly in which a swaged collar member clamps and locks the coupling members together in fluid-tight relation and in which springback of the swaged collar member does not eliminate the clamping stresses exerted thereby on the coupling members.

A yet further object is to provide a swaged tube coupling assembly of the type described in which the collar member in its undeformed condition has in longitudinal section a lip configuration similar to a toggle mechanism including an inner lip portion extending radially and axially outwardly from its base portion and an outer lip portion extending radially and axially inwardly from the outer end of the inner lip portion, whereby as the inner lip portion is swaged into a straight cylinder, the outer lip portion initially moves in a radial direction into engagement with the flange of a coupling member and then axially driving such flange toward the base portion.

Another object is to provide such a swaged tube coupling assembly with seals which are driven into seats with a yielding action during swaging of the collar as aforesaid so as to substantially eliminate the effects of dimensional tolerances of the seals and seats as variables in the sealing stress.

Yet another object is to provide such a tube coupling assembly in which the inner lip poriton of the collar member is stretched axially and the outer lip portion is compressed during swaging of the collar member, whereby the axial sealing force on the sleeve member will still be maintained after release of the swaging force despite springback of such inner and outer lip portions.

Another object is to provide means of disconnecting previously connected tubes without damaging them so that subsequent reconnection is feasible. This can be accomplished either by swaging the collar lips back or by cutting them off.

This general arrangement is not limited to connecting tubes. It can be used for structural connections between circular members, whether or not sealing is involved, which is more efficient in weight and space than bolted flange connections that might otherwise be employed.

These and other objects of the present invention are achieved by providing a coupling including an annular lip having inner and outer lip portions which in the undeformed condition are in the shape of a toggle mechanism, and in the deformed condition, the inner lip portion is cylindrical and extends beyond a radial enlargement on the end of a tube, and the outer lip portion extends radially and axially inwardly into engagement with the radial enlargement, the relative lengths of such inner and outer lip portions with respect to the length of the radial enlargement being such that the radial squeezing forces which are developed during deformation of the lip are transformed into axial coupling forces causing tension in the inner lip portion and compression of the outer lip portion to develop a continuing axial force against the radial enlargement despite springback of the lip.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

In such annexed drawing:

FIG. 5 is similar to FIG. 4 except showing a sleeve-type swaged connector having a separate seal washer insert between the tubes.

Figure 1:
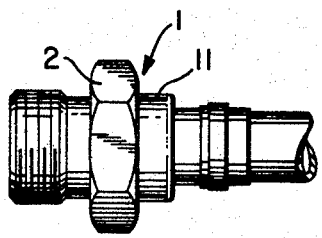
FIG. 1 is a side elevational view of a preferred form of tube coupling in accordance with the present invention to connect a tube to a fitting suitable for a threaded boss connection.
Figure 2:
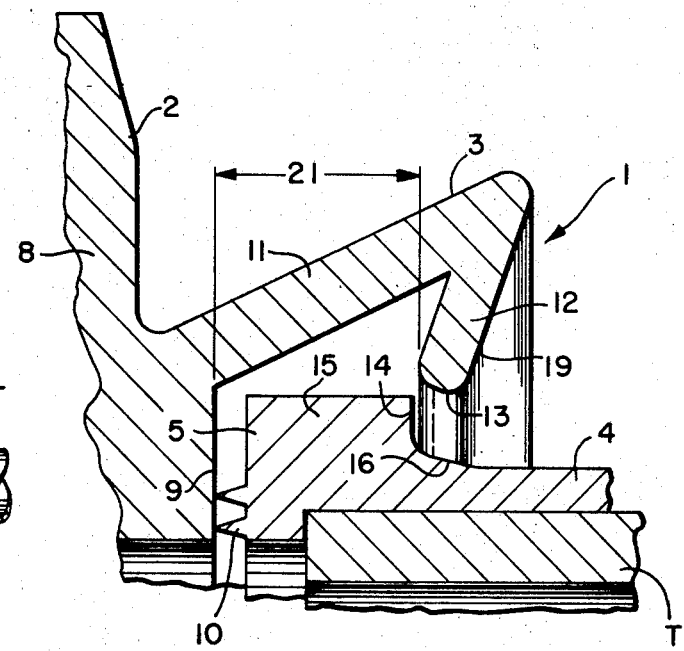
FIG. 2 is a much enlarged radial fragmentary cross-section view showing the coupling parts of FIG. 1 prior to swaging together thereof.
Figure 3:
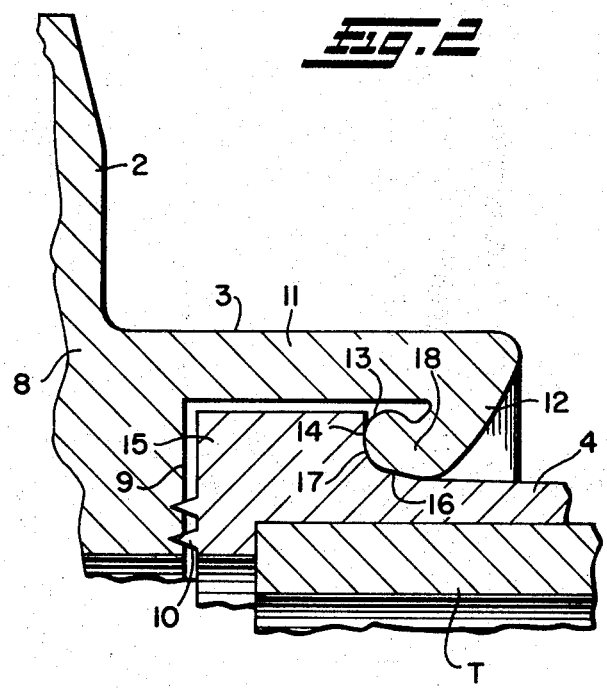
FIG. 3 is an enlarged cross-section view similar to FIG. 2, except showing the completed tube coupling assembly.

Referring now in detail to the drawing and first of all to FIGS. 1–3 thereof, a preferred form of tube coupling assembly in accordance with the present invention is generally indicated at 1 and comprises a collar member 2 provided with an annular lip 3 which is adapted to be swaged into engagement with a sleeve coupling member made of stainless steel or similar type metal. The coupling member 4 is locked to a tube T in such a manner as to provide a strong and fluid-tight joint therebetween, as by the combination press-fit and shrink-fit described in detail in my aforementioned application Ser. No. 192,137, now Pat. No. 3,287,034, the expanded sleeve-tube connection illustrated in FIGS. 6 and 7 herein and described more fully hereinbelow.

As shown in FIG. 2 and 3, the body 8 of the collar member 2 is provided with a plane annular seat 9 in which the sharp crest sealing ribs 10 of small included angle of about 30° projecting from the inner end 5 of the sleeve member 4 are adapted to be embedded in fluid-tight relation when such sleeve end 5 is axially forced against the seat 9. Locking of the sleeve member 4 in the body 8 is effected through the annular lip 3 which in the undeformed condition shown in FIG. 2 is in the shape of a toggle mechanism with an inner frusto-conical lip portion 11 extending radially and axially outwardly from the seat 9 and an outer frusto-conical lip portion 12 extending radially and axially inwardly from the outer end of the inner lip portion 11. Thus, when the inner lip portion 11 is deformed, as by swaging, from its frusto-conical form in FIG. 2 to the cylindrical form of FIG. 3, the rounded inner edge 13 of the outer lip portion 12 will engage the shoulder 14 of the sleeve flange 15. It may or may not also engage the beveled face 16 intersecting such shoulder so as to deform such outer lip portion 12 to the configuration shown in FIG. 3. Due to the toggle configuration of the annular lip 3, a toggle action occurs during the deformation of the lip which transforms the radial squeezing force on the inner lip portion 11 into axial coupling forces which firmly press the sleeve member 4 axially toward the seat 9 whereby the sealing ribs 10 become embedded in such seat to form a primary seal thereat. Since the direction of springback of metal is inherently opposite to the direction of forming forces, the spring back of the annular lip 3 is radial and does not diminish the axial coupling forces after the swaging or deforming forces are released, whereby the axial sealing force on the sleeve member 4 is maintained. Moreover, during such forming of the annular lip 3, the inner lip portion 11 is stretched axially and the outer lip portion 12 is compressed as the sleeve flange 15 is clamped rigidly against the body seat 9 thereby resulting in an elastic axial engaging force. In addition, the springback of the curled end 18 of the outer lip portion 12 exerts pressure axially on the shoulder 14 and radially on the beveled face 16 of sleeve 4 to increase further such axial sealing force.

Preferably, the stresses at the rounded inner edge 13 of the outer lip portion 12 are high enough to form a secondary seal at 17 with the sleeve flange 15. This secondary seal 17 may be sufficient by itself to establish the desired fluid-tight joint, in which case the ribs 10 which form the primary seal may be eliminated if desired, but under those circumstances it may be desirable to provide a malleable coating of gold or the like on the outer surface 19 of the outer lip portion 12 to compensate for any surface irregularities. So also, means other than the annular ribs 10 may be provided for establishing the primary seal between the sleeve member 5 and collar member 2.

As a matter of further information, the slant height of the inner lip portion 11 for a ½″ O.D. tube coupling is about .22″ at an apex angle of about 50° and the dimension 21 is about .141 to .146″ when used with a sleeve flange 15 of nearly the same length from the crest of the ribs 10 to the shoulder 14. The inner lip portion 11 is about .050″ thickness, while the outer lip portion 12 is of less thickness, for example, .040″, and the initial inside diameter of the rounded inner edge 13 of the outer lip portion 12 is of approximately the same diameter as the outside diameter of the sleeve flange 15 except for tolerance to assure easy entrance of the sleeve flange 15 within the annular lip 3 with the crests of the sealing ribs 10 contacting the body seat 9.

Since, in the final assembly of the FIG. 1 coupling the outer surface of the inner lip portion 11 is cylindrical, it is possible to use a tool similar to a conventional tube cutter for transversely severing the inner lip portion 11 at a line axially outward of shoulder 14 whereby the coupling assembly may be taken apart without destroying the sleeve-tube assembly. To reassemble the coupling, a new collar member 2 is used and its frusto-conical lip portions 11 and 12 are deformed as by swaging, from the FIG. 2 to the FIG. 3 condition as discussed above.

Alternatively, the tube coupling assembly 1 may be disassembled without cutting, as by swaging the inner and outer lip portions 11 and 12 back radially outwardly until they clear the sleeve flange 15. This is often preferable to cutting the collar member 2, since there are no chips which might contaminate the tubing or the vehicle.

Figure 4:
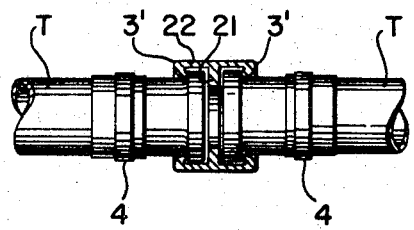
FIG. 4 is a side elevation view, partly in cross-section, showing an integral type swaged connector for joining together a pair of tubes.

In lieu of assembling the sleeve-tube unit 4, T to the body 8 of the collar member 2, as in FIG. 1, a pair of opposed tubes T each with a sleeve member 4 assembled thereon, may be positioned with their sealing ribs 10 engaging the opposite sides of a web 21 in an integral-type swage connector collar member 22 as shown in FIG. 4 in which both ends of the collar member 22 are fashioned in the manner shown in FIG. 2, and swaged, or otherwise deformed, to cylindrical form as shown, thus causing the lips 3′ thereof to be deformed to maintain sealing contact of the seal ribs with the seats on opposite sides of web 21 despite springback of the swaged end portions.

With reference to FIG. 5, the coupling herein shown is substantially the same as shown in FIG. 4 except that instead of an integral web 21 in the double ended swage connector collar member 23, there is provided a separate washer 24 which has seats on opposite sides for the sealing ribs of the respective sleeve members 4. It should be understood, however, that the washer 24 or web 21 could be eliminated altogether, in which case the sealing would be accomplished solely by intimate contact between the outer lip portion 12′ and shoulder 14′. Moreover, in addition to connecting tubes and ducts, the tube coupling assemblies described herein could be used to connect together other articles as well, such as the flanges of valve bodies, for example.

I, therefore, particularly point out and distinctly claim as my invention:

1. A coupling for articles comprising a body having a deformable integral annular lip projecting therefrom to define with said body an annular recess, a seat in said annular recess, and an article having a radial enlargement adjacent one end which is clamped between said seat and lip upon deformation of said lip to establish a fluid-tight joint between said radial enlargement and said seat, said lip comprising inner and outer lip portions, said inner lip portion in its deformed condition being of cylindrical configuration and extending axially beyond said radial enlargement, said outer lip portion in its deformed condition extending radially and axially inwardly from the outer end of said inner lip portion into engagement with said radial enlargement, the relative length of said inner and outer lip portions with respect to the length of said one end of said article to the far end of said enlargement being such that said inner lip portion is under tension and the outer lip portion is under compression, whereby there is an axial force applied against said radial enlargement by said lip despite springback of said lip.

2. The coupling of claim 1 wherein said radial enlargement has a radially extending shoulder facing said outer lip portion having a curled end including a first radially inwardly extending portion and a second radially outwardly extending portion connected to said first portion, said second portion also extending axially toward said radially extending shoulder and engaging the same, said second portion urging said radially extending shoulder toward said body due to the springback of said curled end.

3. The coupling of claim 1 wherein there are a pair of said deformable integral annular lip projecting from said body in opposite directions, each defining with said body an annular recess for receipt therein of radial enlargements adjacent the ends of articles, said radial enlargements being adapted to be clamped between said seat and lips upon deformation of said lips as aforesaid to establish such fluid-tight joints.

4. The coupling of claim 1 wherein said lip in its initial undeformed condition is in the shape of a toggle mechanism with said inner lip portion extending radially and axially outwardly from said body and said outer lip portion extending radially and axially inwardly from the outer end of said inner lip portion, whereby when said lip is deformed, the radial squeezing forces are transformed into axial coupling forces which firmly maintain said radial enlargement in engagement with said body despite springback of said lip.

5. The coupling of claim 2 wherein said article also has an outer face beveled radially outwardly in the direction of said radially extending shoulder and intersecting the same, said lip having been deformed from an initial condition whereat said lip is of a diameter larger than said enlargement to a final condition whereat said curled end urges said radially extending shoulder toward said seat as aforesaid, such force being due to the springback of said lip subsequent to deforming 6. A coupling for tubes comprising a body having an annular recess therein, an outer lip portion axially spaced from the rear wall of said recess, and an inner lip portion connecting said outer lip portion to said body, said inner lip portion in its undeformed condition having a frusto-conical configuration extending radially and axially outwardly from said body, and said outer lip portion in its undeformed condition also having a frusto-conical configuration, but extending radially and axially inwardly from the outer end of said inner lip portion; and a tube having a radial enlargement at one end which is adapted to be clamped between said body and lip portions to establish a fluid-tight joint between said body and tube, the minimum diameter of said lip portions in their undeformed condition being slightly greater than the diameter of said radial enlargement for receipt of said radial enlargement therein, said radial enlargement having a radially extending shoulder facing said outer lip portion, said outer lip portion in the assembled condition having a curled end including a first radially inwardly extending portion and a second radially outwardly extending portion connected to said first portion, said second portion also extending axially toward said radially extending shoulder and engaging the same, said second portion urging said radially extending shoulder toward the rear wall of said recess due to the springback of said curled end, the relative lengths of said inner and outer lip portions with respect to the length of said one end of said article to the far end of said enlargement being such that said inner lip portion in its deformed condition is under tension and said outer lip portion in its deformed condition is under compression, thereby creating an axial sealing force additionally urging said radial enlargement toward said rear wall of said recess despite springback of said lip portions.

References Cited

UNITED STATES PATENTS

| 1,170,927 | 2/1916 | Moore | 285—382 X |
| 2,363,586 | 11/1944 | Guarnaschelli | 285—331 X |
| 2,574,625 | 11/1951 | Coss | 285—382 X |
| 3,287,034 | 11/1966 | Bragg | 285—115 |

FOREIGN PATENTS

| 297,122 | 5/1954 | Switzerland. |

THOMAS F. CALLAGHAN, Primary Examiner

U.S. Cl. X.R.

285—382.4, 398